United States Patent
Kitagawa et al.

[11] Patent Number: 6,130,708
[45] Date of Patent: Oct. 10, 2000

[54] TRIGGER GENERATOR AND WAVEFORM MONITOR

[75] Inventors: Tsuyoshi Kitagawa, Tokyo; Norihiko Sato, Chiba, both of Japan

[73] Assignee: Sony/Tektronix Corporation, Tokyo, Japan

[21] Appl. No.: 09/235,694

[22] Filed: Jan. 22, 1999

[30] Foreign Application Priority Data

Jan. 23, 1998 [JP] Japan .................................. 10-026707

[51] Int. Cl.[7] .............................. H04N 17/00; H04N 5/46
[52] U.S. Cl. ......................... 348/184; 348/185; 348/194; 348/555
[58] Field of Search ..................................... 348/180, 184, 348/185, 194, 558, 555; H04N 17/00, 5/46

[56] References Cited

U.S. PATENT DOCUMENTS 5,057,910  10/1991  Judge .
5,153,725  10/1992  Masaike .

*Primary Examiner*—Sherrie Hsia
*Attorney, Agent, or Firm*—John Smith-Hill; Smith-Hill and Bedell

[57] ABSTRACT

A waveform monitor receives HDTV and SDTV signals that are provided to a channel and an external trigger terminal respectively. An HDTV signal processor 14 produces a reference clock PCLK from the HDTV signal. A counter starts counting at the vertical sync signal of the SDTV signal and generates a trigger every time the count of the reference clock PCLK reaches a predetermined number (2,200, for example). This allows generation of a trigger signal which is phase locked to the vertical sync signal of the SDTV signal, and of which the frequency is the same as the horizontal line frequency of the HDTV signal. Therefore the waveform monitor can display the HDTV waveform line by line even though the HDTV and SDTV signals have different numbers of lines per field. The waveform monitor can be used to measure phase difference between television signals of difference formats, such as the HDTV and the SDTV.

17 Claims, 3 Drawing Sheets

TRIGGER GENERATOR AND WAVEFORM MONITOR

FIELD OF THE INVENTION

The present invention relates to a trigger generator and a waveform monitor, and more particularly to a monitor to display the waveform of a first television signal line by line when the first television signal is provided to a channel and a second television signal having the same field interval as the first television signal but a different number of lines per field is provided to the external trigger terminal.

BACKGROUND OF THE INVENTION

Many signal formats are used for broadcast of television signals. For example, the high definition TV (HDTV), which is a next generation format, the standard definition TV (SDTV) such as NTSC and D2 (digitized NTSC). Standard NTSC is an interlaced signal format, and another format that is in use is non-interlaced, or progressive scan NTSC, which is converted from the original interlaced format to non-interlaced format by digital technology. The same program sometimes may be broadcast in multiple formats. Therefore, it may be necessary to convert a program recorded in one format such as HDTV into another format such as SDTV.

Even though two television signals may be of the same format and from the same source, they may be shifted in phase and not synchronized because, for example, the lengths of the respective signal paths are different. In such a case, the GEN lock system may be used to synchronize the signals.

A conventional waveform monitor has at least one channel which receives a television signal at an input terminal and processes the signal to allow the waveform monitor to display the waveform of the signal. The channel is able to extract the horizontal and vertical sync signals of the television signal and employ one of the sync signals to generate triggers, which control display of the waveform of the television signal.

A waveform monitor that has a trigger circuit particularly for television signals measures characteristics between the television signals in the GEN lock system such as level of synchronization or phase difference. The trigger circuit generates a trigger signal pulse, for example in response to a specific signal element such as the horizontal or vertical sync pulse of the input television signal, to generate a sweep signal in the waveform monitor so as to display repeatedly the waveform of a desired portion of the television signal.

In the above case, one of the television signals may be provided to the external trigger of the waveform monitor as a reference signal to generate the trigger signal, and others to the channels of which waveforms are displayed in response to the trigger. This allows the phase differences between the television signals of the channel inputs relative to the reference signal to be measured. If the television signals of the channels are synchronized, the corresponding sync portions of the waveforms would align.

The waveform monitor may have a line select function that is useful to measure the phase relationship between the reference signal and other television signals of the channels. If a user selects the 102nd line, for example, this function would allow displaying the waveform of the 102nd line in the 1125 lines constituting one frame of the HDTV signal. If the reference signal is synchronized with the HDTV of the channel, the monitor would display a waveform overlapped by a picture signal wherein the overlap begins from the 41st line according to the HDTV standard, it being understood that line 41 is the first of the non-blanking lines. If they do not synchronize, the overlap would not begin from the 41st line but from another line.

If two television signals are of the same format, it is easy to generate the trigger signal according to the sync pulses because the intervals of the sync pulses are same. In case of different formats, such as HDTV and SDTV, it would be difficult to generate the trigger signal according to the horizontal sync pulses because the number of lines per field for the different formats, and hence the horizontal sync intervals, are different from each other.

As shown in FIG. 4A–4D, HDTV and SDTV signals having the same field interval (e.g. 16.68 ms, corresponding to a vertical frequency of 59.94 Hz) have different numbers of lines per field, for example, 562.5 and 262.5 lines respectively, in case of interlaced formats. Besides an SDTV (or HDTV) interlaced format has a different number of lines per field than an SDTV (or HDTV) non-interlaced format.

Video signals having the same content and field interval are sometimes delivered in different formats, that is, different definition levels and aspect ratios, such as HDTV and SDTV at present. So it is desired to measure the phase difference between one television signal as a reference signal and any of other different formats wherein the reference signal is provided to the external trigger terminal while the other signal is provided to the channel to display the waveform as to the horizontal sync signal. In one specific case of the above that is economical, an NTSC signal is selected as the reference, and the waveform of a selected line of an HDTV signal is displayed to measure the phase difference between them. This is because if a digital signal is selected as the reference, the decoder would currently be expensive.

As described above, what is desired is to display the waveform of a line of one television signal format though the reference signal for the trigger generation is in a different format having the same field interval but a different number of lines per field, such as the HDTV and the SDTV. It is also desired to provide a means for measuring the phase difference between the different television signal formats.

SUMMARY OF THE INVENTION

Accordingly the present invention provides a trigger generator for displaying a waveform in a waveform monitor. Besides, the present invention may be used as a trigger circuit as a part of an apparatus for just sampling or digitizing an input signal received in the channel to store the signal in memory.

A trigger generator of the present invention to which first and second television signals, having the same field interval but different line frequencies, are provided, generates a trigger signal of which phase is locked to the vertical sync signal of the second television signal and of which the frequency is equal to the line frequency of the first television signal.

If the first television signal were a digital signal, the trigger generator would have a counter means, which receives the reference clock of the first television signal and the vertical sync signal of the second television signal. The counter means starts counting the reference clock at the vertical sync of the second television signal and generates a trigger signal every time the count reaches the desired number of reference clocks.

In another case, the trigger generator may have a phase locked loop (PLL) oscillator of which dividing ratio is the number of lines in one field of the first television signal and of which output signal is phase locked to the vertical sync of the second television signal. The PLL oscillator may have a dividing means, a phase comparing means and a voltage controlled oscillating means. The dividing means divides the output signal of the PLL oscillator by the number of lines in one field of the first television signal. The phase comparing means compare the phase of the vertical sync pulse of the second television signal with the phase of the output signal of the dividing means and produces a voltage depending on the phase difference. Then the voltage controlled oscillating means controls the frequency of the output signal of the PLL oscillator in order to reduce the output voltage of the phase comparing means.

A waveform monitor of the present invention may have first and second input terminals receiving a first television signal and the vertical sync signal of a second television signal, respectively, in which the second television signal has the same field interval as the first television signal but a different number of lines per field. The first and second input terminals may be, respectively, a channel terminal and the external trigger terminal of the waveform monitor in a preferred case. The monitor further has a means for generating a trigger signal of which phase is locked to the vertical sync of the second television signal and of which the period is equal to the interval of the vertical sync of the second television signal divided by the number of lines in one field of the first television signal. Then the waveform monitor displays the waveform of the first television signal according to the trigger signal.

The waveform monitor according to the present invention could display the waveform of the first television signal line by line even though the first and second television signals have different numbers of lines per field. This makes it possible to measure, for example, how much the first television signal is delayed relative to the reference signal (or the second signal). Therefore even if different television signals such as digital, analog, or formats having different numbers of lines per field were provided, the second input (more specially, the external trigger) terminal could receive any of the signals. In other words, the user could select any of the signals as the reference signal that would be the most easy to handle. If the reference signal were a digital signal, it would currently require an expensive decoder, so the analog NTSC signal would be reasonable as the reference signal and the waveform monitor would display the waveform of the HDTV signal provided to the channel (first terminal).

The trigger generating means of the above waveform monitor can be realized in several ways. If the first television signal is digital, the trigger generating means may have a digital processing means and a counter means. The digital processing means extracts the reference clock from the first television signal. The counter means starts counting the reference clock at the vertical sync of the second television signal and generates a trigger signal every time the count of reference clocks reaches a predetermined number.

Besides, the trigger generating means may have a phase locked loop (PLL) oscillator of which the dividing ratio is the number of lines per field of the first television signal. The phase of the output (trigger) signal of the PLL oscillator is locked to the vertical sync of the second television signal.

DESCRIPTION OF PREFERRED
EMBODIMENTS OF THE INVENTION

A waveform monitor of the present invention receives first and second television signals which have the same field interval and different numbers of lines per field and displays the first signal line by line while the other signal provided to the external trigger terminal is used as a reference signal. The waveform monitor can be used to measure the phase relationship between the HDTV and the SDTV when video source material is provided in the HDTV format and is converted to the SDTV format in order to broadcast in both formats simultaneously. It can also be used to measure the phase relationship between an interlaced NTSC signal and a non-interlaced NTSC signal converted from the interlaced signal.

Figure 1:
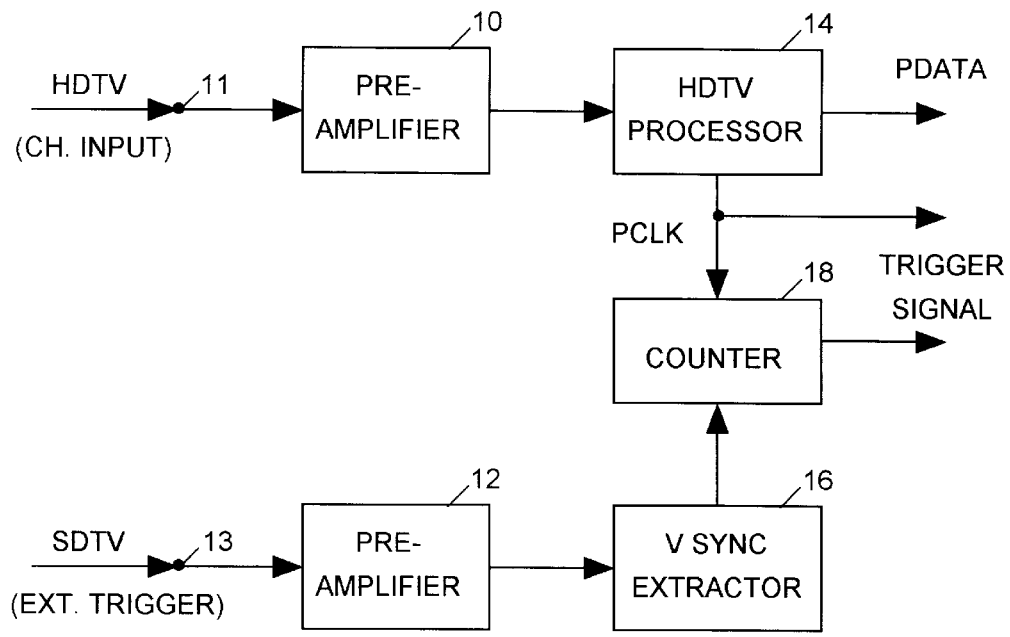
FIG. 1 is a schematic block diagram of one preferred embodiment according to the present invention.

FIG. 1 shows a schematic block diagram of a trigger-generating portion of one embodiment according to the present invention. In this embodiment, an input (first input) terminal or channel terminal 11 receives a digital television signal as a first television signal. In the case of FIG. 1, the digital television signal applied to the input terminal 11 is an HDTV signal, but any digital television signal, such as a signal in digitized NTSC or D2 format, could be also used as the first television signal. The HDTV signal may be provided to the channel terminal 11 of the waveform monitor (which is shown partially) by a coaxial cable. The monitor may have plural channels as usual, but for simplicity only one channel is shown in the drawings. An attenuator/pre-amplifier 10 amplifies the input signal and provides impedance matching between the coaxial cable and an HDTV signal processor 14, which converts and decodes the input signal from serial to parallel to reproduce data PDATA and a reference clock PCLK, separately. Getting the reference clock PCLK is important when the first television signal is digital.

An external trigger (or second input) terminal 13 of the waveform monitor receives a second television signal. In the case of FIG. 1, the second television signal is an SDTV signal, and it may be in digital or analog, interlaced or non-interlaced, format. Besides, it is not necessary for the second television signal to include all the components of a television signal, but it is only necessary that it include the vertical sync signal. An attenuator/pre-amplifier 12 supplies the SDTV signal to a vertical sync extractor 16, which extracts the vertical sync signal from the SDTV signal. A counter 18 starts counting the pulses of the reference clock PCLK in response to the extracted vertical sync of the SDTV signal and generates a trigger signal every time the count reaches a predetermined number (2,200 clocks in case of interlaced HDTV).

The frequencies of the television signal are determined very accurately according to the TV standard to display a stable picture. Therefore the waveform monitor can provide a stable waveform display even though the trigger is not produced from the displaying signal but is artificially produced as described above.

Figure 2:
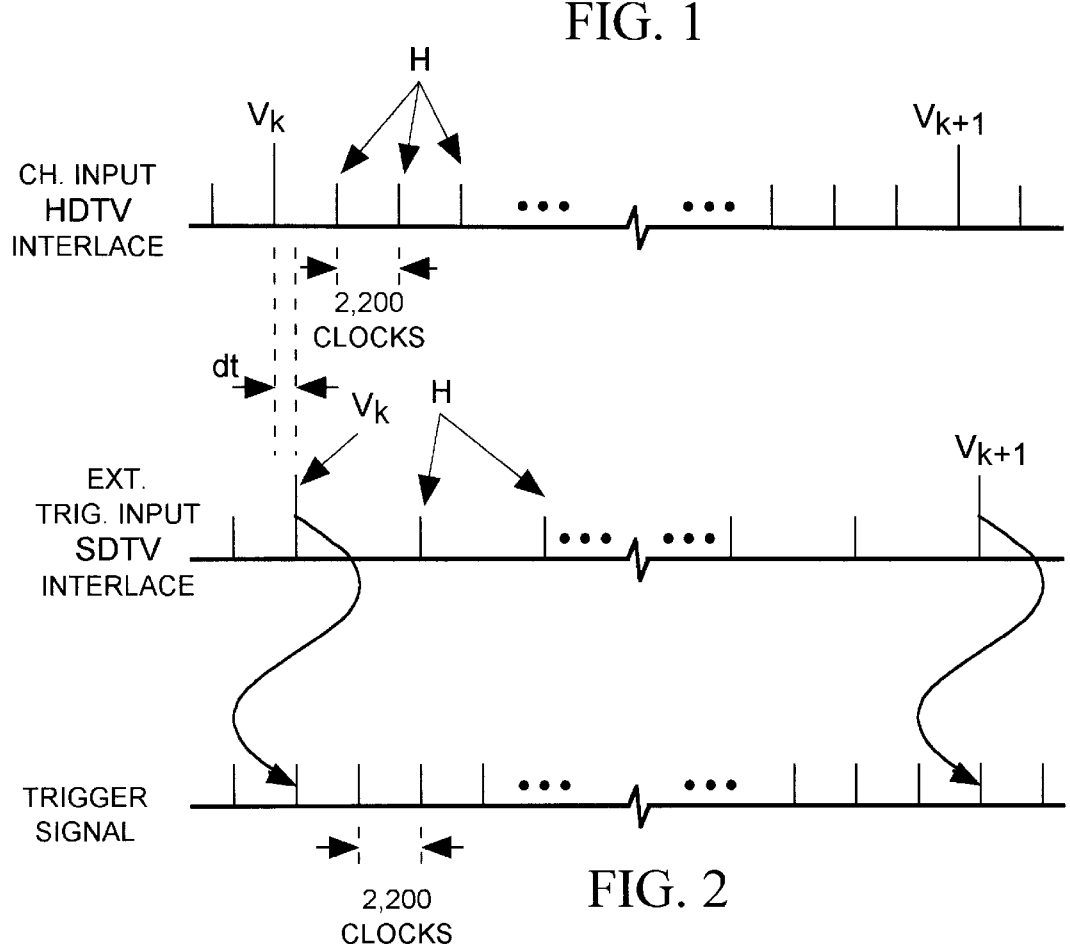
FIG. 2 is a timing chart of the HDTV, SDTV and trigger signal of one preferred embodiment according to the present invention.

Referring to FIG. 2, a time difference dt shows that the HDTV and SDTV signals have a phase difference when these are provided to the channel 11 and the external trigger terminal 13, respectively. The phase of the trigger signal is locked on the vertical sync V of the SDTV signal, or the second television signal while the interval is the same as of the horizontal sync H of the HDTV, or the first television signal.

FIG. 1 suggests the HDTV signal processor, or digital signal processor 14 should be included in the waveform monitor. The HDTV signal processor 14, however, need not be in the waveform monitor as long as the counter 18 receives the reference clock PCLK. That is, the reference clock PCLK may be produced outside the waveform monitor and provided to the trigger circuit, and any television signal would be provided to another channel (not shown) to display the waveform if necessary.

Figure 3:
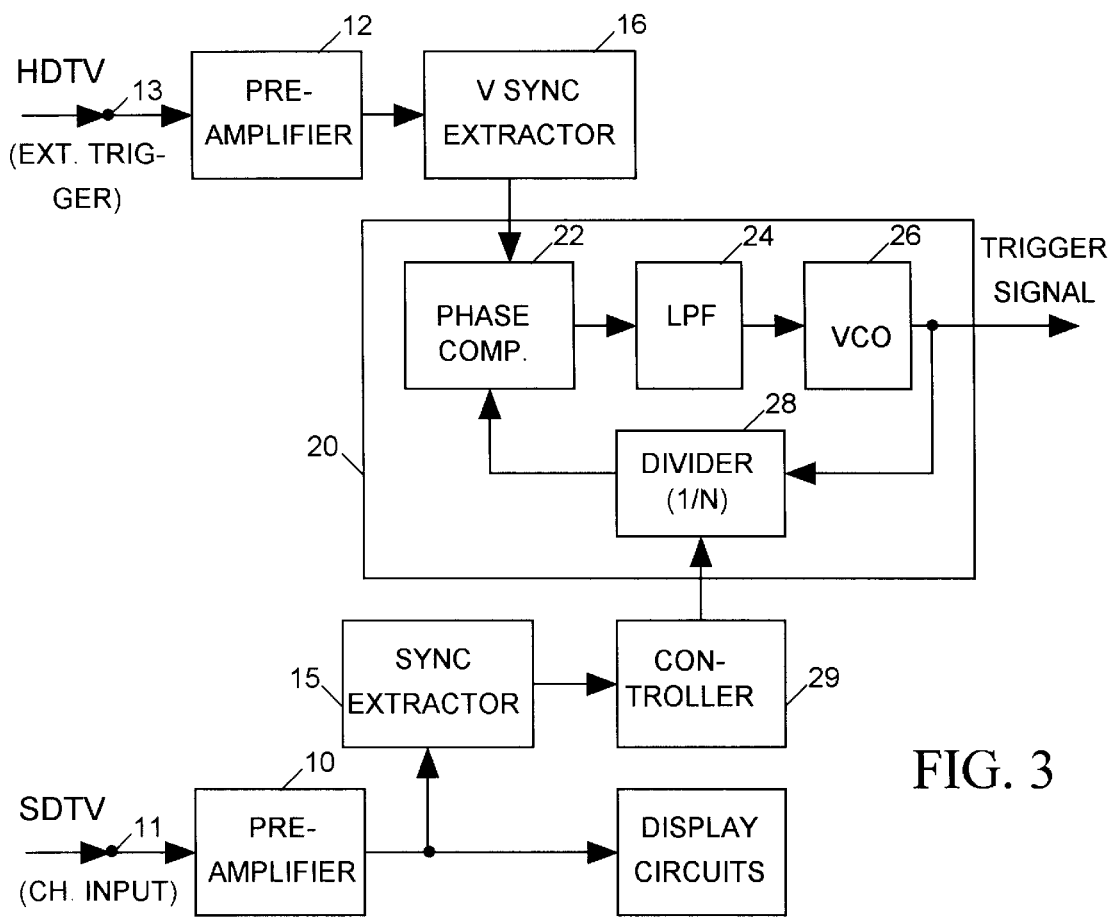
FIG. 3 is a block diagram of another preferred embodiment according to the present invention, FIGS. 4A–4D, which are collectively referred to as FIG. 4 show the relationship between fields and lines in each frame of the HDTV and SDTV formats.

FIG. 3 shows a schematic block diagram of another embodiment of the present invention. In accordance with FIG. 3, the channel terminal or first input terminal 11 of a waveform monitor receives an analog television signal (NTSC in this case). The channel input terminal 11, however, could receive and handle a digital television signal. Display circuits following an attenuator/pre-amplifier 10 are shown as a single block in FIG. 3 because they are similar to the usual circuits in a waveform monitor. The point is that the television signal provided to the channel 11 is not necessary for generating a trigger signal directly in this embodiment, which means that it is not necessary to produce the reference clock PCLK described above. Instead of this, a PLL oscillator is employed for the trigger generation.

An external trigger terminal 13 receives an HDTV signal. An attenuator/pre-amplifier 12 supplies the HDTV signal to a vertical sync extractor 16, which produces the vertical sync signal from the HDTV signal. The HDTV signal applied to the external trigger terminal 13 may be of analog or digital format and the vertical sync extractor 16 would be flexible according to the received formats.

The vertical sync signal extracted in the vertical sync extractor 16 is provide to a phase locked loop (PLL) oscillator 20. A divider 28 has the dividing ratio N that is the number of lines in one field of the SDTV signal. An arithmetic controller 29 of the waveform monitor can control the dividing ratio N according to the input of the channel 11. The arithmetic controller may be a microprocessor, for example. If the channel 11 received an NTSC signal, the dividing ratio N would be 262.5 because the number of lines per field of the NTSC signal is 262.5.

FIG. 3 shows that the output signal of the attenuator/pre-amplifier 10 is also supplied to a sync extractor 15, which extracts the horizontal and vertical sync signals. A counter in the controller 29 counts the number of horizontal sync pulses in the NTSC signal and is reset in response to the vertical sync pulse. Thus, the counter counts the number of lines per field. The controller supplies the count to the divider as the value N. It will be appreciated that the sync extractor and counter are not necessary, and that the user could provide the value of N to the controller through a front panel control.

A phase comparator 22 compares the phase of the vertical sync component of the HDTV signal and the signal which is obtained by dividing the output signal of the PLL oscillator 20 by the dividing ratio N. A low pass filter (LPF) 24 converts the output pulses of the phase comparator 22 into a voltage according to the phase difference. A voltage controlled oscillator (VCO) 26 controls the frequency of the VCO output signal in order to reduce the output voltage of the LPF 24. Therefore the PLL oscillator 20 generates a trigger signal which is locked in phase to the vertical sync signal provided by the sync extractor 16 and of which the interval is equal to the interval of the vertical sync signal of the HDTV signal divided by N. In other words, the PPL oscillator 20 uses the vertical sync signal as a reference frequency and the phase of the output signal (trigger signal) is locked to the reference signal, or the vertical sync component of the HDTV signal. The PLL oscillator 20 shown in FIG. 3 is just one embodiment and other PLL oscillators could be used instead.

Accordingly, if the television signal (HDTV in case of FIG. 2) of the channel is delayed relative to the television signal (SDTV in case of FIG. 2) of the external trigger terminal, the waveform on the display (not shown) of the waveform monitor would shift some distance to the left, assuming that the evolution of time is represented in the display by progression from left to right. On the other hand, if the phase of the channel signal is advanced, the waveform on the display would shift some distance to the right. The left or right shift of the waveform can be detected by employing another channel of the waveform monitor to display the waveform of a reference signal. A plurality of channels, of course, may be provided and receive television signals, respectively, for measuring the phase relationship between the signals of the channels relative to the reference signal, similarly.

FIGS. 4A–4D show relationship between lines and fields in one frame. For example, one frame of an interlaced format has two fields. In case of interlaced formats, the HDTV and SDTV signals have 562.5 and 262.5 lines in each field, respectively. In case of non-interlaced formats, the HDTV and SDTV signals have 1125 and 525 lines in each field, respectively.

The dividing ratio N is changed according to the number of lines per field of the first television signal provided to the first input terminal (or channel). Since the different scanning systems (interlace and non-interlace) have different numbers of lines per field, the dividing ratio N depends not only upon the definition level (HDTV or SDTV) but also on the scanning system.

In case of FIG. 1, it is necessary to change the number of pulses of the reference clock PCLK that the counter 18 should count according to the number of lines per field of the first television signal. In case of FIG. 3, the dividing ratio N of the divider 28 should be the number of lines per field of the first television signal.

Figure 5:
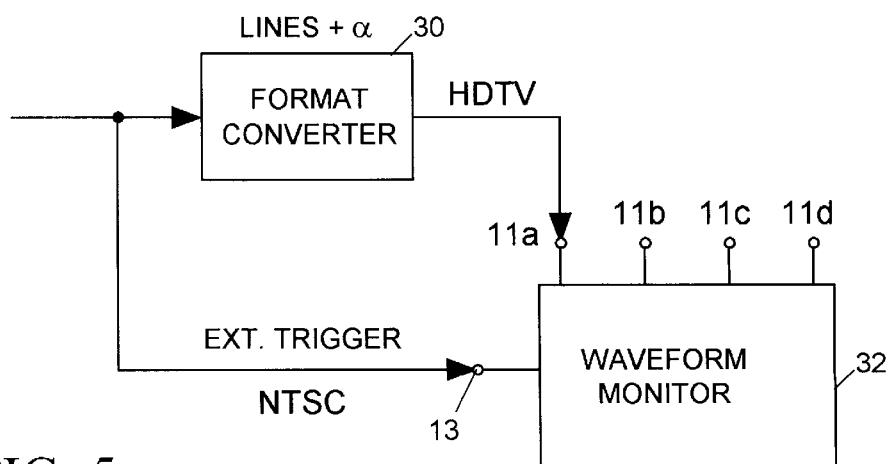
FIG. 5 is a block diagram of one application using the present invention.
Figure 4A:
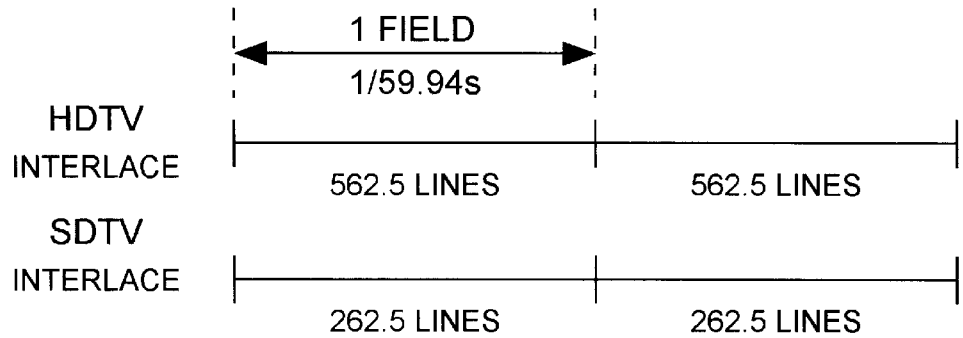
Figure 4B:
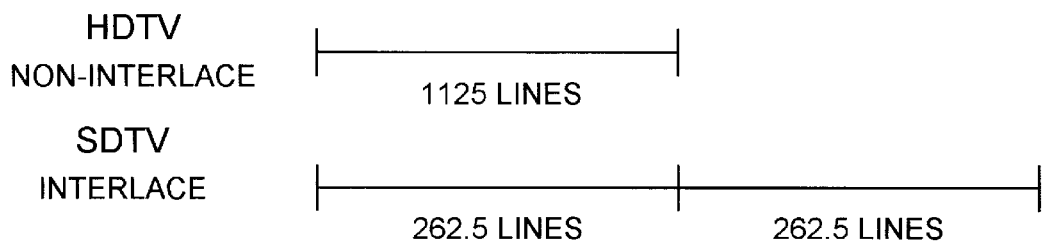
Figure 4C:
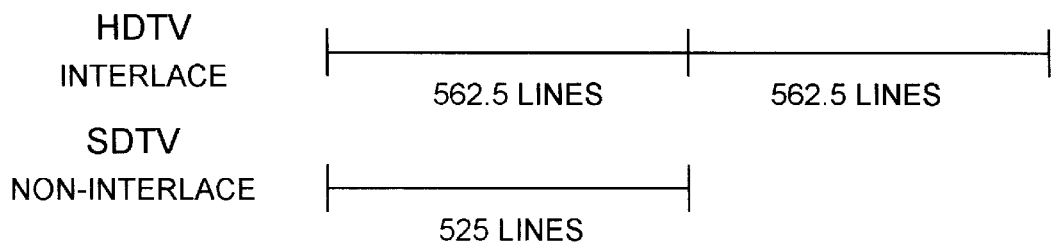
Figure 4D:
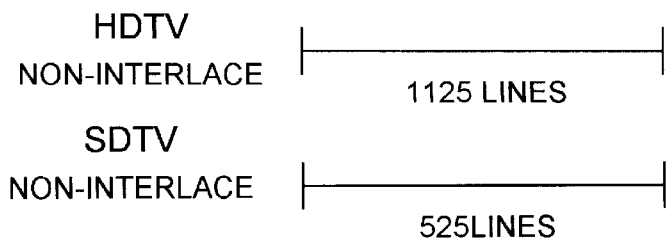

FIG. 5 shows an application of the waveform monitor according to the present invention. A format converter 30 converts one television format into another and, in case of FIG. 5, an NTSC signal into an HDTV signal. The NTSC signal is also provided to the external trigger terminal 13 as a reference signal. The HDTV signal from the format converter 30 is provided to one of four channels 11a–11d (the channel 11a here) of the waveform monitor.

The up-conversion in the format converter 30 requires a time τ. In general, τ is equal to $nT_H + \alpha$, where n is an integer, $T_H$ is the horizontal interval of the NTSC signal and α is a remainder. The HDTV signal is delayed by the converting time τ relative to the original NTSC signal. When the waveform monitor 32 displays the waveform of the channel 11a using the line select function, the first line containing a picture signal will not be line 41 (counting from the vertical sync pulse of the NTSC signal) as prescribed in the HDTV standard but a later one. This means that the waveform has some delay that equals some lines and a while. This allows measuring how much time the converter 30 needs for the conversion.

The phase relationship relative to the reference signal could be measured or seen as a waveform, similarly, in case of not only up-conversion like FIG. 5, but also the down-conversion from an HDTV signal into an SDTV signal. By the way, the signal transmission from the converter 30 to the monitor 32 also produces delay, which, however, would be usually negligible compared with the conversion delay in the converter 30.

As described above, the present invention produces a trigger signal having the interval that evenly divides the interval of the vertical sync of a second television signal by the number of lines per field of a first television signal. Therefore the waveform of the first television (channel) signal could be displayed line by line though the channel (or first input terminal) and the external trigger terminal (second input terminal) receive a signal which has a different number of lines per field. It is convenient for the users of broadcasting station to handle the plural TV formats.

We claim:

1. A trigger generator comprising:
   a control means for receiving a first television signal having a field interval $T_F$ and a line frequency $F_{L1}$, and
   a trigger generating circuit for receiving at least the vertical sync signal of a second television signal having a field interval $T_F$ and a line frequency $F_{L2}$ and generating a trigger signal which is phase locked to the vertical sync signal of the second television signal, the trigger generating circuit being responsive to the control means to generate said trigger signal at a frequency $F_{L1}$.

2. A trigger generator according to claim 1, wherein the control means generates a control signal representative of the number of lines per field of the first television signal and the trigger generating circuit uses the control signal to control the frequency of the trigger signal.

3. A trigger generator according to claim 1, for receiving as the first television signal a digital signal including a reference clock signal, and wherein the control means includes a counter means responsive to the vertical sync signal of the second television signal for counting the reference clock of the first television signal and for generating a trigger every time the count reaches a predetermined value.

4. A trigger generator according to claim 1, which generates the trigger signal by evenly dividing the period of the vertical sync signal of the second television signal by the number of lines per field of the first television signal.

5. A trigger generator according to claim 1, wherein the trigger generating circuit comprises a phase-locked loop oscillator which generates the trigger signal and wherein the phase-locked loop oscillator includes a divider which divides the frequency of the trigger signal by the number of lines per field of the first television signal.

6. A trigger generator according to claim 1, wherein the trigger generating circuit includes a phase-locked loop oscillator comprising:
   a dividing means having a numerator input at which the dividing means receives the trigger signal and a denominator input at which the dividing means receives the number of lines per field of the first television signal, the dividing means generating an output signal at a frequency equal to the frequency of the trigger signal divided by the number of lines per field of the first television signal,
   a phase comparing means for comparing phase of the vertical sync signal of the second television signal and phase of the output signal of the dividing means and generating a control voltage according to phase difference, and
   a voltage-controlled oscillating means generating said trigger signal at a frequency that reduces the control voltage generated by the phase comparing means.

7. A trigger generator for a waveform monitor receiving a first television signal having a field interval $T_F$ and a line frequency $F_{L1}$, the trigger generator receiving at least the vertical sync signal of a second television signal having a field interval $T_F$ and a line frequency $F_{L2}$, the trigger generator generating a trigger signal which is phase locked to the vertical sync signal of the second television signal and has a frequency $F_{L1}$.

8. A waveform monitor having a first input terminal for receiving a first television signal having a field interval $T_F$ and having a line frequency $F_{L1}$ and a second input terminal for receiving at least the vertical sync signal of a second television signal having a field interval $T_F$ and having a line frequency $F_{L2}$, the waveform monitor including a trigger generating means for generating a trigger signal which is phase locked to the vertical sync signal of the second television signal and has a frequency $F_{L1}$.

9. A waveform monitor according to claim 8, for receiving a digital signal including a reference clock as the first television signal, and wherein said trigger generating means comprises a counter means responsive to the vertical sync signal of the second television signal to start counting the reference clock of the first television signal and to generate a trigger each time the count reaches a selected value.

10. A waveform monitor according to claim 8, wherein the trigger generating means comprises a phase-locked loop oscillator which generates the trigger signal and wherein the phase-locked loop oscillator includes a divider which divides the frequency of the trigger signal by the number of lines per field of the first television signal.

11. A waveform monitor according to claim 8, wherein the trigger generating means comprises a phase-locked loop oscillator comprising:
    a dividing means having a numerator input at which the dividing means receives the trigger signal and a denominator input at which the dividing means receives the number of lines per field of the first television signal, the dividing means generating an output signal at a frequency equal to the frequency of the trigger signal divided by the number of lines per field of the first television signal,
    a phase comparing means for comparing phase of the vertical sync signal of the second television signal and phase of the output signal of the dividing means and generating a voltage according to phase difference, and
    a voltage-controlled oscillating means for generating said trigger signal at a frequency that reduces the control voltage generated by the phase comparing means.

12. A method of using a waveform monitor to display the waveform of a first television signal having a field interval $T_F$ and a line frequency $F_{L1}$, said method including the steps of:
    (a) generating a trigger signal in response to a second television signal, which has a field interval $T_F$ and a line frequency $F_{L2}$, and
    (b) employing the trigger signal to control display of the waveform of the first television signal by the waveform monitor, wherein the trigger signal is phase locked to the vertical sync signal of the second television signal and has a frequency $F_{L1}$.

13. A method according to claim 12, wherein the method includes generating the trigger signal by evenly dividing the period of the vertical sync signal of the second television signal by the number of lines per field of the first television signal.

14. A method according to claim 12, wherein the first television signal is a digital signal including a reference clock at a frequency $N_R$ times the line frequency and step (a) comprises counting the reference clock in response to the vertical sync signal of the second television signal and generating the trigger signal every time the count reaches $N_R$.

15. A method according to claim 14, wherein said first television signal is an HDTV signal.

16. A method according to claim 14, wherein $N_R$ is 2200.

17. A method according to claim 14, wherein said second television signal is an SDTV signal.

* * * * *